US007124353B2

(12) United States Patent
Goodwin et al.

(10) Patent No.: US 7,124,353 B2
(45) Date of Patent: Oct. 17, 2006

(54) SYSTEM AND METHOD FOR CALCULATING A USER AFFINITY

(75) Inventors: James Patrick Goodwin, Beverly, MA (US); Andrew Lewis Schirmer, Andover, MA (US); Carl Joseph Kraenzel, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 10/044,922

(22) Filed: Jan. 15, 2002

(65) Prior Publication Data

US 2003/0135818 A1 Jul. 17, 2003

Related U.S. Application Data

(60) Provisional application No. 60/347,283, filed on Jan. 14, 2002.

(51) Int. Cl.
*G06F 17/21* (2006.01)
(52) U.S. Cl. ..................................... 715/500
(58) Field of Classification Search ................. 715/500
See application file for complete search history.

(56) References Cited

U.S. PATENT DOCUMENTS

| 4,744,028 | A | 5/1988 | Karmarkar .................. 364/402 |
| 5,740,549 | A | 4/1998 | Reilly et al. ................... 705/14 |
| 5,761,512 | A | 6/1998 | Breslau et al. ............. 395/705 |
| 5,895,470 | A | 4/1999 | Pirolli et al. ................. 707/102 |
| 6,041,311 | A | 3/2000 | Chislenko et al. ............ 705/27 |
| 6,078,918 | A | 6/2000 | Allen et al. ..................... 707/6 |
| 6,115,709 | A | 9/2000 | Gilmour et al. ................ 707/9 |
| 6,144,944 | A | 11/2000 | Kurtzman, II et al. ........ 705/14 |
| 6,154,783 | A | 11/2000 | Gilmour et al. ............ 709/245 |
| 6,205,472 | B1 | 3/2001 | Gilmour ...................... 709/206 |
| 6,208,994 | B1 | 3/2001 | Abdelnur ..................... 707/103 |
| 6,240,466 | B1 | 5/2001 | McKeehan et al. ......... 709/316 |
| 6,349,295 | B1 | 2/2002 | Tedesco et al. ................ 707/3 |
| 6,353,840 | B1 | 3/2002 | Saito et al. .................. 707/517 |

(Continued)

FOREIGN PATENT DOCUMENTS

EP         1 087 306         3/2001

(Continued)

OTHER PUBLICATIONS

Vivacqua, Adriana, et al., "Agents to Assist in Finding Help"—Conference on Human Factors & Computing Systems Proceedings, in the Hague, the Netherlands, Apr. 2000, pp. 65-72.*

(Continued)

*Primary Examiner*—Doug Hutton
(74) *Attorney, Agent, or Firm*—Pillsbury Winthrop Shaw Pittman, LLP (57) ABSTRACT

A system and method for determining a user affinity for a category. The system calculates an affinity score based on a record of actions performed on the document by a user and a categorization of the document. This affinity score is computed by a weighted sum of factors associated with the document. The affinity score is normalized and a population threshold is applied. A predetermined percentage of the population of users associated with the document is determined and those users are said to have an affinity for at least one category assigned to the document. The system may also decay an affinity score if a user has not performed at least one action on the document. If the user performs an action on the document, however, the affinity may be reset. A user, system administrator or other user may also be enabled to decline an affinity for a category.

60 Claims, 4 Drawing Sheets

U.S. PATENT DOCUMENTS

| | | | |
|---|---|---|---|
| 6,377,949 B1 | 4/2002 | Gilmour | 707/10 |
| 6,377,983 B1 * | 4/2002 | Cohen et al. | 707/4 |
| 6,397,203 B1 | 5/2002 | Hembry | 707/2 |
| 6,405,197 B1 | 6/2002 | Gilmour | 707/5 |
| 6,421,669 B1 | 7/2002 | Gilmour et al. | 707/9 |
| 6,513,039 B1 * | 1/2003 | Kraenzel | 707/9 |
| 6,516,350 B1 | 2/2003 | Lumelsky et al. | 709/226 |
| 6,553,365 B1 | 4/2003 | Summerlin et al. | 707/2 |
| 6,560,588 B1 | 5/2003 | Minter | 706/50 |
| 6,604,110 B1 | 8/2003 | Savage et al. | 707/102 |
| 6,626,957 B1 | 9/2003 | Lippert et al. | 715/513 |
| 6,633,916 B1 | 10/2003 | Kauffman | 709/229 |
| 6,640,229 B1 | 10/2003 | Gilmour et al. | 707/5 |
| 6,647,384 B1 | 11/2003 | Gilmour | 707/5 |
| 6,668,251 B1 * | 12/2003 | Goldberg | 707/5 |
| 6,687,873 B1 | 2/2004 | Ballantyne et al. | 715/500 |
| 6,697,800 B1 | 2/2004 | Jannink et al. | 707/5 |
| 6,711,570 B1 * | 3/2004 | Goldberg et al. | 707/6 |
| 6,714,936 B1 | 3/2004 | Nevin, III | 707/102 |
| 6,732,331 B1 | 5/2004 | Alexander | 715/513 |
| 6,754,648 B1 | 6/2004 | Fittges et al. | 707/1 |
| 6,772,137 B1 | 8/2004 | Hurwood et al. | 707/2 |
| 6,789,054 B1 | 9/2004 | Makhlouf | 703/6 |
| 6,801,940 B1 | 10/2004 | Moran et al. | 709/224 |
| 6,816,456 B1 | 11/2004 | Tse-Au | 370/230.1 |
| 6,832,224 B1 * | 12/2004 | Gilmour | 707/100 |
| 6,836,797 B1 | 12/2004 | Givoly et al. | 709/223 |
| 2002/0049621 A1 | 4/2002 | Bruce | 705/7 |
| 2002/0049750 A1 | 4/2002 | Venkatram | 707/3 |
| 2002/0078003 A1 | 6/2002 | Krysiak et al. | 707/1 |
| 2002/0087600 A1 | 7/2002 | Newbold | 707/514 |
| 2002/0111934 A1 | 8/2002 | Narayan | 707/1 |
| 2002/0152244 A1 | 10/2002 | Dean et al. | 707/530 |
| 2003/0028525 A1 | 2/2003 | Santos et al. | 707/3 |
| 2003/0105732 A1 | 6/2003 | Kagalwala et al. | 707/1 |
| 2004/0068477 A1 | 4/2004 | Gilmour et al. | 707/1 |
| 2004/0111386 A1 | 6/2004 | Goldberg et al. | 707/1 |
| 2004/0205548 A1 | 10/2004 | Bax et al. | 715/513 |

FOREIGN PATENT DOCUMENTS

EP      1 143 356      10/2001

OTHER PUBLICATIONS

TACIT—KnowledgeMail & KnowledgeMail Plus, "Creating the Smarter Enterprise" (Tacit Knowledge Systems, Inc., © May 2001).* http://www.forbes.com/global/2001/0205/088_print.html, as it appeared on 26 Feb. 20.*

McDonald, David W., "Evaluating Expertise Recommendations"—Proceedings of the 2001 International ACM SIGGROUP Confernce on Supporting Group Work, in Boulder, Colorado, Oct. 2, 2001, pp. 214-223.* http://www.tacit.com, as it appeared on Dec. 7, 2000.*

Wang, Jidong, et al., "Ranking User's Relevance to a Topic through Link Analysis on Web Logs" at the Proceedings of the 4th International Workshop on Web Information and Data Management in McLean, Virginia; pp. 49-54 (ACM Press—Nov. 8, 2002).*

Maybury et al., "Expert Finding for Collaborative Virtual Environments", *Communications of the ACM*, vol. 44, No. 12, Dec. 2001, pp. 1, 2, 55, 56.

Mattox et al., "Enterprise Expert and Knowledge Discovery", *Proceedings of the International Conference on Human Computer Interaction Conference*, Aug. 23-27, 1999, Munich, Germany, 11 pages.

"Automated Expertise Profiling Saves Time", http://www.tacit.com/products/profiling.html, printed Jan. 9, 2002, 3 pages.

"KnowledgeMail", http://www.tacit.com/products/knowledgemail.html, printed Jan. 9, 2002, 3 pages.

"Expertise Discovery & Search", http://www.tacit.com/products/espdiscovery.html, printed Jan. 9, 2002, 2 pages.

* cited by examiner

SYSTEM AND METHOD FOR CALCULATING A USER AFFINITY

RELATED APPLICATIONS

This application claims priority to U.S. Provisional Application No. 60/347,283 titled "Knowledge Server," filed Jan. 14, 2002, which is hereby incorporated by reference. This application is related to U.S. Pat. No. 7,000,194, filed Sep. 22, 1999, which is also hereby incorporated by reference.

This application is also related to commonly owned U.S. Pat. No. 6,377,983, titled "Method and System for Conveying Expertise Based on Document Usage," filed Nov. 13, 1998, which is hereby incorporated by reference. This application is also related to commonly owned U.S. Pat. No. 6,356,898, titled "Method and System for Summarizing Topics of Documents Browsed by a User," filed Nov. 13, 1998, which is hereby incorporated by reference. This application is also related to commonly owned U.S. Pat. No. 6,513,039, titled "Profile Inferencing Through Automated Access Control List Analysis Heuristics," filed Jun. 24, 1999, which is incorporated herein by reference.

FIELD OF THE INVENTION

The invention relates to a system and method for determining a user's affinity with a particular topic by using a formula to calculate a person's affinity based on historical actions of the user on particular documents and categorization of the documents.

BACKGROUND OF THE INVENTION

Many organizations have some form of employee directory and usually have made an attempt to augment this directory with personal profile attributes such as memberships, position, title or project affiliations. Many have attempted to expand each employee's profile by adding skills inventory, educational background or professional accomplishments. Many of these efforts have been successful, but most have not fulfilled their goal. The effort required to update and maintain such a profile and a subjective nature of self-description leads to inaccuracies or stale data.

Often, people who have relevant knowledge in a particular topic are not contacted because a method to search for persons with such knowledge has not been implemented. Most such people finder systems fail due to a lack of timely updates to an employee's profile. In addition, knowledgeable workers may not consider their experience to be valuable to others and may overlook this when manually completing profile forms. The result is that many manually built expertise locator systems are irrelevant or become outdated and eventually fail.

These and other drawbacks exist.

SUMMARY OF THE INVENTION

One object of the invention is to overcome these and other drawbacks of existing systems.

Another object of the invention is to provide a system and method for facilitating locating users with expertise in a particular topic.

Another object of the invention is to provide a system and method for facilitating locating users with expertise in a particular topic by assigning categories to objects associated with the users.

Another object of the invention is to provide a system and method for facilitating locating users with expertise in a particular topic by mapping between the categories and objects associated with the users.

Another object of the invention is to provide a system and method for facilitating locating users with expertise in a particular topic by maintaining a record actions performed on an object by the users.

Another object of the invention is to provide a system and method for facilitating locating users with expertise in a particular topic by calculating an affinity score for a user based on an object category and an actions record.

Another object of the invention is to provide a system and method for facilitating locating users with expertise in a particular topic by calculating an affinity based on a weighted sum of factors associated with an object including whether the user is an author or editor, if the user is responding to another object, if the user merely views the object, and if the object includes links to other objects.

Another object of the invention is to provide a system and method for facilitating locating users with expertise in a particular topic where the affinity score is calculated based on the weighted sum of factors over all time.

Another object of the invention is to provide a system and method for facilitating locating users with expertise in a particular topic where the affinity score decays over an inactive period of time.

Another object of the invention is to provide a system and method for facilitating locating users with expertise in a particular topic where the affinity score may be reset after any action is performed on the object.

These and other objects of the invention are achieved according to various embodiments of the invention. According to one embodiment, a system, method and processor readable medium comprising processor readable code embodied therein are provided that calculate a user affinity score for at least one category. The system includes at least one categorized document The document may be categorized according to a topic provided in the document. The document may be mapped to one or more categories. A record of actions performed on the document by one or more users may be maintained. A weighted sum of a user's role and actions on the document in a category may be computed to determine an affinity score for that user's contribution to the category. The affinity score may be calculated as a sum over all time. The affinity score may be normalized and a population threshold may be applied such that a predetermined top percentage of users in each category may be designated as having an affinity for the category. The affinity may be based on a user's role in accessing the document, for example, whether the user is an author, editor, or reader of the document, whether the user is responding to another object of the same or different category, and whether the object includes links to other documents or objects of the same or different category.

If a user does not perform any actions on the document for a predetermined period of time, that user's affinity may decay. The rate at which user's affinity may decay may be at a constant rate or other rate determined by, for example, a system administrator. The user's affinity may be calculated as a sum over all time using a formula of:

$$A*Va+T*Vt+L*Vl+E*Ve+R*Vr;$$

where A is an author field, Va is an author value associated with the author field, T is a response to field, Vt is a response to value associated with the response to field, L is a links field, Vl is a links value associated with the links field, E is an editor's field, Ve is an editor's value associated with the editor's field, R is a reading field and Vr is a reading value associated with the reading field.

These and other objects, features and advantages of the invention will be readily apparent to those having ordinary skill in the pertinent art from the detailed description of the embodiments with reference to the appropriate figures below.

DETAILED DESCRIPTION OF PREFERRED EMBODIMENTS

A system, method, and processor readable medium having processor readable code embedded therein for determining a user affinity for a category is disclosed. The system may be used to facilitate locating users having an expertise or knowledge in a particular area. The system may automatically determine relationships between users and documents. The relationships may be based on a record of actions performed on documents by a user and a categorization of the documents.

Figure 1:
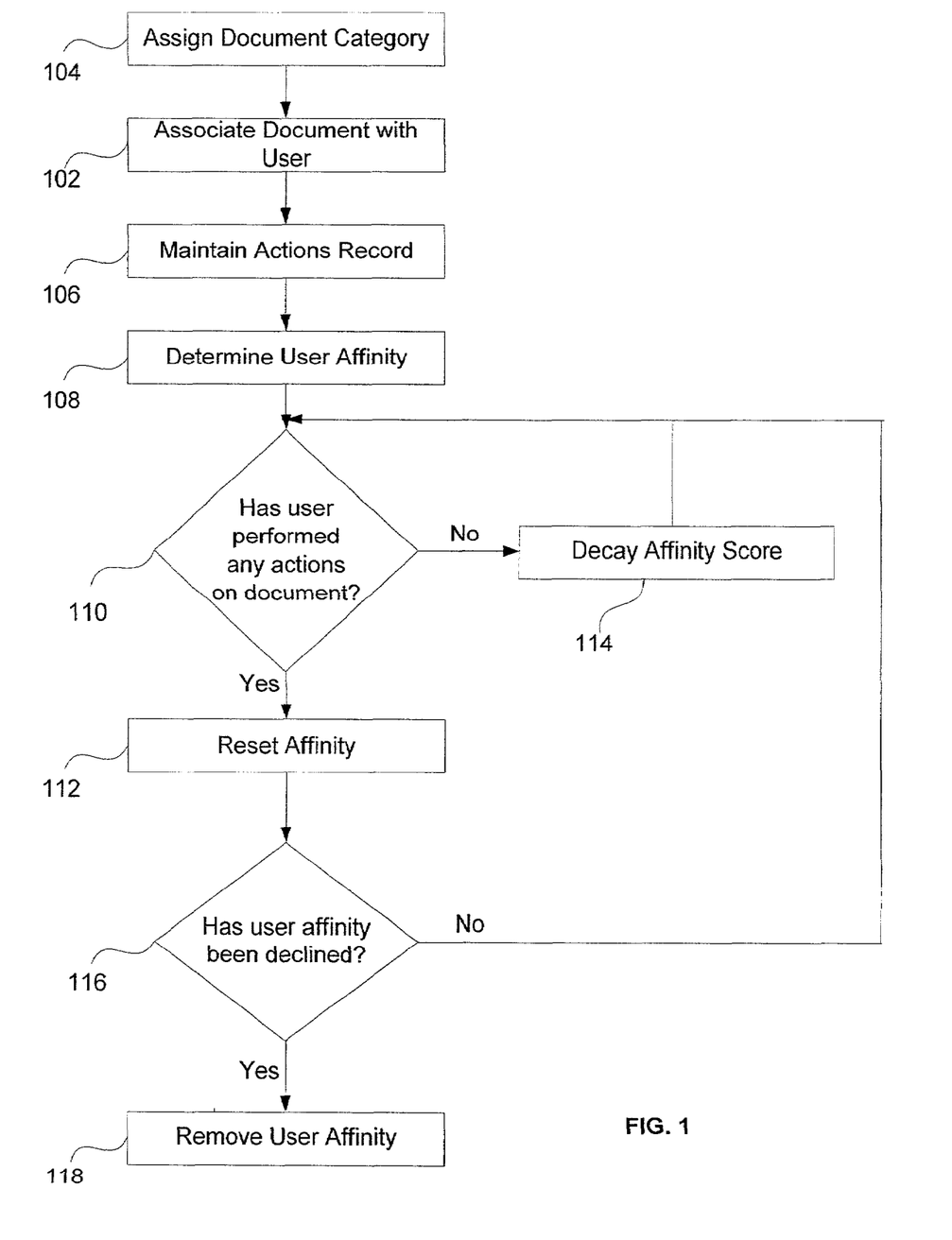
FIG. 1 is a schematic block diagram of a method for determining a user affinity according to one embodiment of the invention.

FIG. 1 illustrates a method for determining a user affinity for a category according to one embodiment of the invention. A category may be assigned to, for example, a document, step 102. The category may be assigned, for example, when the document is created. The category may be assigned, for example, based on repeated words in the document, images, or other criteria. Additionally, categories may be changed or other categories may be assigned to the document by, for example, a system administrator or other user, after the document's creation. The document may then be associated with a user, step 104. The document may be associated with the user when the user creates, edits, views or otherwise accesses the document. An actions record may be maintained, step 106. The actions record may identify actions that have been performed on a document by a user, time of action, duration of action, and other criteria. Based on actions performed on the document by a user and the category or categories assigned to the document, a user affinity may be determined, step 108. The user affinity may be a score calculated based on the user's actions regarding a particular document and the categories assigned to the document as described in further detail below with reference to FIG. 2.

After a user affinity has been determined, a determination may be made regarding whether the user has performed any additional actions on the document, step 110. If the user has performed additional actions on a document, the score used to identify the affinity may be reset, step 112. If, however, the user has not performed any actions on the document after a predetermined period of time, for example, one (1) week, the user affinity may decay. The user affinity may decay, for example, by a predetermined percentage after a predetermined period of time. For example, a user affinity for a particular category may have a score of one hundred (100). If the user does not perform any actions on the document, the score may be reduced by, for example, twenty (20) percent, after each week of non-activity. After the user affinity has been decayed, a determination may be made regarding whether the user has performed any actions on the document for up to, for example, another week. If the user does not perform any actions on the document, the user affinity may be decayed by, for example, another twenty (20) percent. If the user performs an action on the document, however, the user affinity may be reset, step 112. Therefore, the score used to determine the user affinity may be reset to one hundred (100). The process of decaying may be repeated until a score of, for example, zero (0) is obtained or the user performs an action on the document. If a score of zero (0) is obtained, however, and the user performs an action on the document, the user affinity may be reset to, for example, one hundred (100).

A user or system administrator may be provided with an option of declining a user affinity. A determination may be made regarding whether the user or system administrator has declined the user affinity for a particular category, step 116. If the user or system administrator has declined the user affinity, the user affinity may be removed, step 118. If the user or system administrator has not declined user affinity, a determination may be made regarding whether the user has performed any actions on the document, step 110. According to one embodiment, a user or system administrator may designate whether other users may decline a particular user's affinity for a category.

Figure 2:
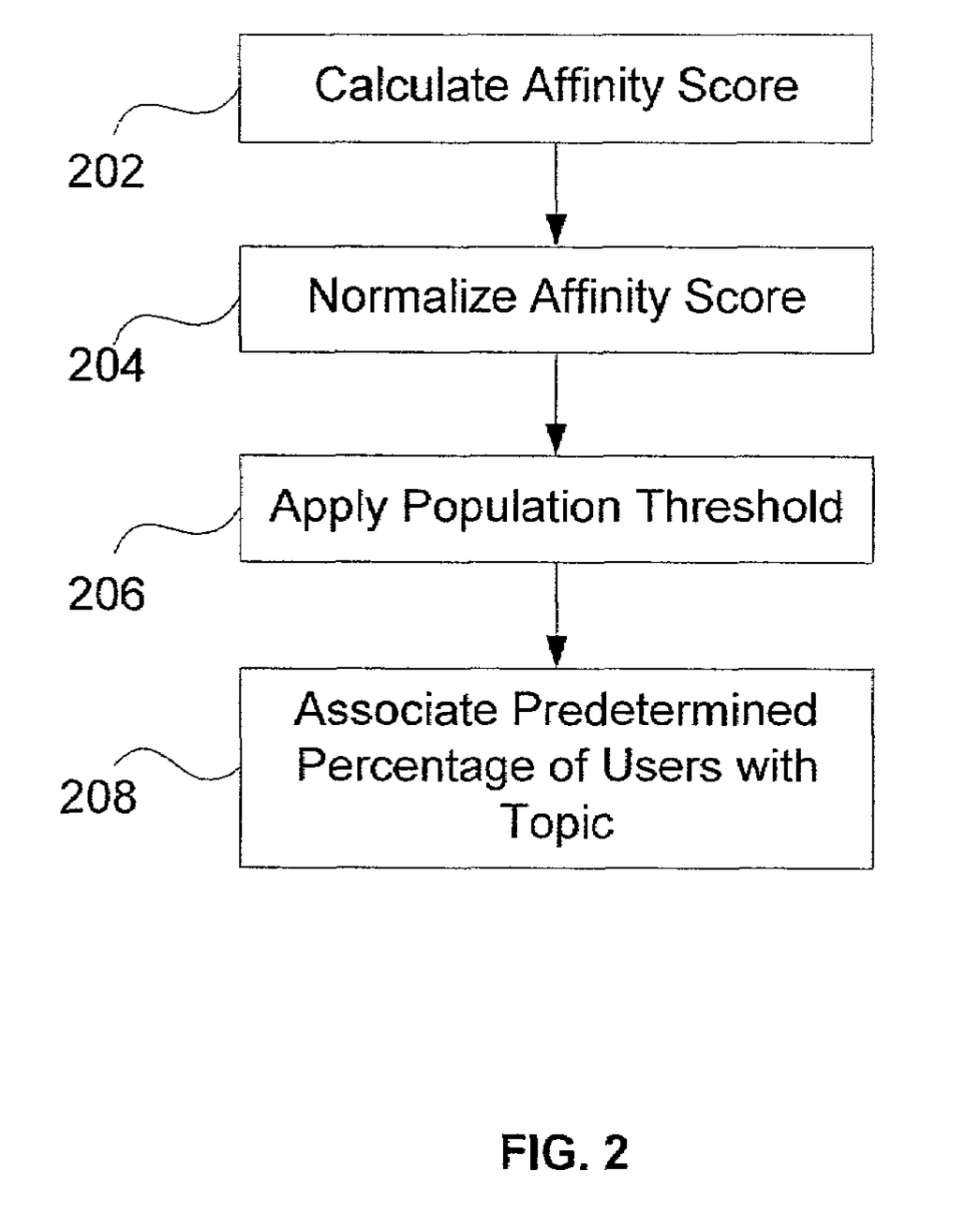
FIG. 2 is a schematic block diagram of a method for calculating an affinity score for determining a user affinity according to one embodiment of the invention.

A method for determining a user affinity is shown in F*ig*.2. The user affinity may be determined by calculating an affinity score, step 202. The score may be based at least in part on meta data for a document. The meta data may include an author field, response to field, links field, editor's field, and reading field. The author field may identify the author of the document, the editor's field may identify any user that may have edited the document. The response to field may identify whether the document is in response to another document. The links field may identify whether the document links to another document. Thus, for example, if a particular user is listed in the author, editor, and reading field, a higher affinity score may be calculated. The affinity score may also be based on actions performed on the document by the user. According to one embodiment of the invention, an affinity score may be calculated by assigning a value to the meta data of the document. For example, a value may be assigned to each of the author, response to, links, editor's, and reading fields. Each of the fields may be multiplied by the value associated with that field and then each product for all of the meta data may be added together to compute the affinity score. For example, a formula for calculating an affinity score may be:

$$A*Va+T*Vt+L*Vl+E*Ve+R*Vr;$$

where A is the author field, Va is an author value associated with the author field, T is a response to field, Vt is a response to value associated with the response to field, L is a links field, Vl is a links value associated with the links field, E is an editor's field, Ve is an editor's value associated with the editor's field, R is a reading field and Vr is a reading value associated with the reading field. Each value associated with the fields may differ based on importance or other criteria. For example, the author value may be higher than the reading value. This may be because an author may have more knowledge in a particular category as opposed to a user who merely reads or views the document. According to one embodiment of the invention, a reading portion of the above formula may be calculated as:

$$\log 10(R+0.0001)*Vr$$

This may assist in preventing popular or frequently visited documents from dominating the affinity score. Any method of weighting and assigning values may be used. The formula may also include other or additional action/value pairs such as, for example:

$$X*Vx+Y*Vy$$

where X and Y are other actions that may be identified as showing knowledge of a topic and Vx and Vy are values associated with the X and Y actions. Any amount of N actions may be used in the formula.

After calculating the affinity score, the affinity score may be normalized, step 204. Normalization may be performed according to any known manner. After normalizing the affinity score, a population threshold may be applied to the affinity score, step 206. The population threshold may identify all users that receive an affinity score of, for example, higher than zero (0), for a category. A predetermined percentage of the users within the population threshold may then be identified as having an affinity for the category, step 208. The affinity score may be cumulative for all time.

Figure 3:
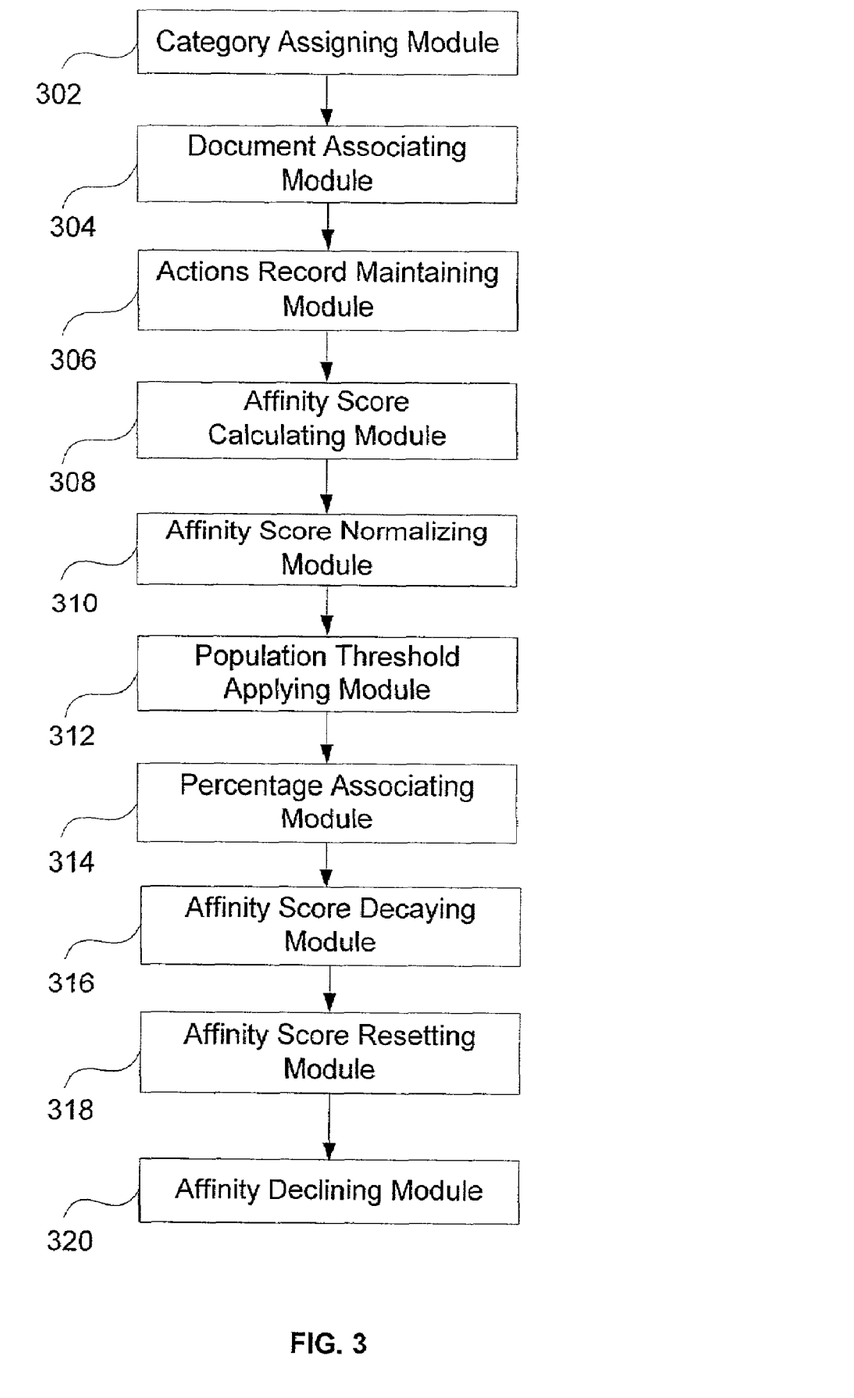
FIG. 3 is a schematic block diagram of a system for determining a user's affinity according to one embodiment of the invention.

FIG. 3 is a block diagram of a system for determining a user affinity according to one embodiment of the invention. The system may include a category assigning module 302, document associating module 304, actions record maintaining module 306, affinity score calculating module 308, affinity score normalizing module 310, population thresholds applying module 312, percentage association module 314, affinity score maintaining module 316, affinity score the setting module 318, and affinity declining module 320. Category assigning module 302 may enable one or more categories to be assigned to a document. The categories may be, for example, assigned when the document is created. Alternatively, a system administrator and/or one or more users may be granted rights for assigning, changing, or deleting categories assigned to one or more documents.

Document associating module 304 may associate a document with one or more users. The association may be, for example, a user to category relationship. Document associating module 304 may identify categories associated with a user according to the categories assigned to documents that the user has accessed. Actions record maintaining module 306 may be used to maintain a record of actions performed on a document by a user. For example, actions record maintaining module 306 may maintain a record of when a document is accessed by viewing, editing, creating, or other action performed by a particular user. The actions record may identify a date and time at which the document is accessed, an action performed on the document, and other information.

An affinity score may be calculated based on the actions record and categories assigned to documents by affinity score calculating module 308. Affinity score calculating module 308 may use meta data included with the document to calculate an affinity score. The meta data may include the following information: author, response to, links, editors, and reading. A value may be associated with each meta data. For example, an author value may be assigned to the author information, a response value may be assigned to the response to information, a links value may be assigned to the links information, an editor's value may be assigned to the editors information, and a reading value may be assigned to the reading information. The affinity score may be a sum over all time and may be calculated using a formula of:

$$A*Va+T*Vt+L*Vl+E*Ve+R*Vr;$$

where A is the author field, Va is the author value, T is a response to field, Vt is the response to value, L is a links field, Vl is the links value, E is an editor's field, Ve is the editor's value, R is a reading field and Vr is the reading value. According to one embodiment of the invention, a reading portion of the above formula may be calculated as:

$$\log 10(R+0.0001)*Vr$$

This may assist in preventing popular or frequently visited documents from dominating the affinity score. The affinity score may then be normalized using affinity score normalizing module 310. The affinity score may be normalized to any normalized value and according to any known normalizing method. After normalizing the affinity score, population threshold applying module 312 may identify users having a normalized affinity score of, for example, higher than zero (0). A predetermined percentage of users having a normalized affinity score higher than zero (0) may then be associated with the document using percentage association module 314. The users within this percentage may then be identified as having an affinity for a category assigned to the document.

If a user does not perform an action on a document for which the user has an affinity, the affinity score may be decayed using affinity score decaying module 316. The affinity score may be decayed at a constant or other rate and may be set by a system administrator or other user. For example, if a user has not performed any actions on a document for one (1) week, the affinity score may be decreased by twenty (20) percent. After each week of non-activity, the affinity score may be decreased by an additional twenty (20) percent. This may continue until the affinity score becomes zero (0), or a user performs an action on the document. If a user performs an action on the document, the affinity score may be reset by affinity score resetting module 318. Therefore, the affinity score may be set to the original affinity score provided to the user for the category.

According to one embodiment of the invention, the user, system administrator or other user may decline an affinity for a particular category. The users or system administrator may decline the affinity using affinity declining module 310. Users other than the user for which the affinity is associated, may be granted rights for declining affinities for categories to other users.

Figure 4:
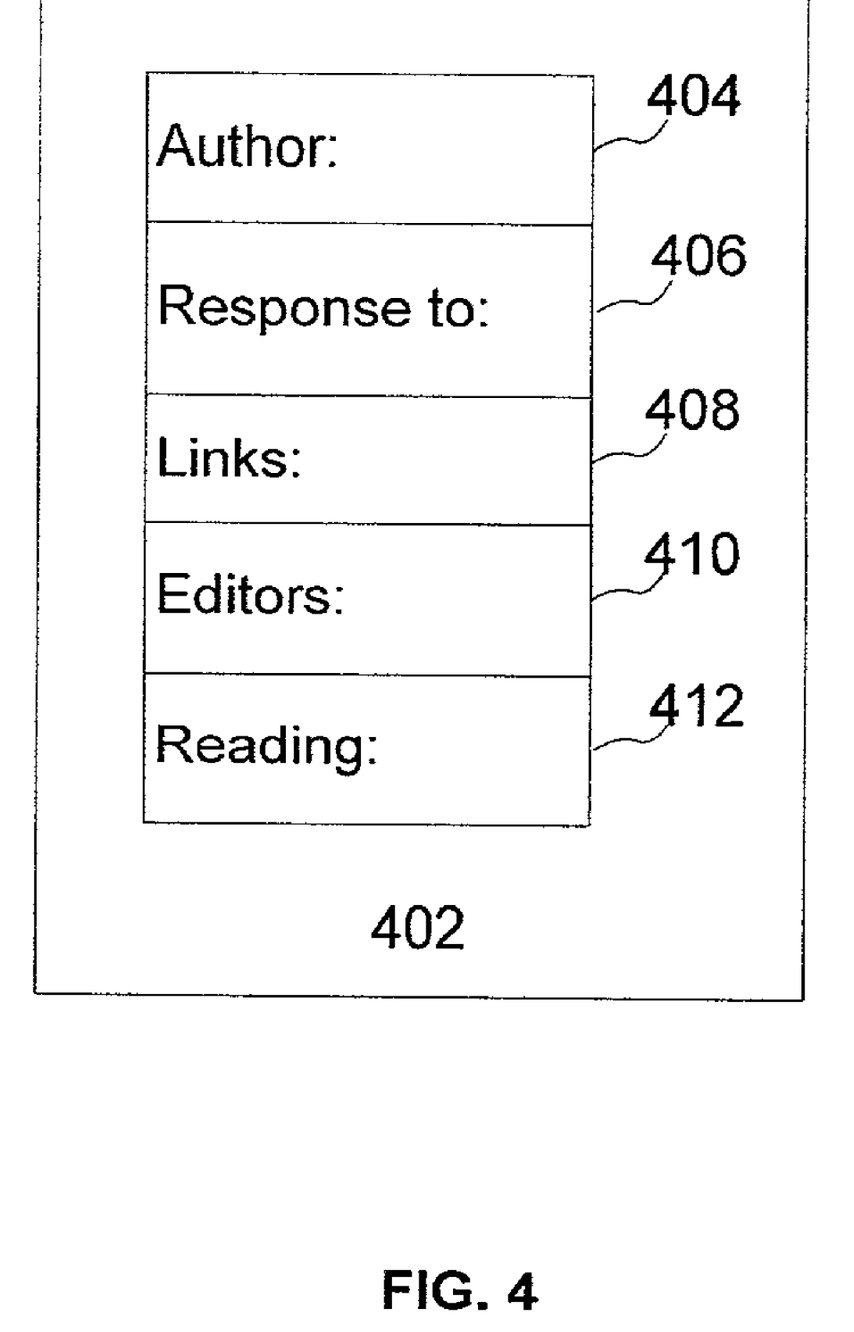
FIG. 4 is a schematic diagram of a document that may be used to determine a user affinity according to one embodiment of the invention.

FIG. 4 illustrates a document 402 according to one embodiment of the invention. Document 402 may include an author field 404, response to field 406, links field 408, editor's field 410, and reading field 412. The authors field 404 may identify the author of the document. Response to field 406 may identify whether the document was created in response to one or more other documents. Links field 408 may identify whether the document links to other documents or other documents link to document 402. Editors field 410 may identify users who have edited document 402. Reading field 412 may identify users that have read, or at least displayed, document 402.

According to one embodiment of the invention, a user may search for other users having an affinity for one or more categories. The search may be performed in any manner. The user may search for all users having an affinity for a particular category, users having an affinity score higher than a certain threshold, or other criteria.

Other embodiments and uses of the invention will be apparent to those skilled in the art in consideration of the specification and practice of the invention disclosed herein. The specification and examples should be considered exemplary only. For example, although the invention has been described in terms of a document, a document may be any electronic document that may be categorized, for example, electronic mail messages, graphic files or other type of electronic document. Additionally, although the invention has been described in terms of multiple modules, fewer or a greater number of modules may be used and modules may not be provided in the same location. The scope of the invention is only limited by the claims appended hereto.

What is claimed is:

1. A method for determining a user affinity for a topic comprising the steps of:
    assigning a category to at least one object;
    associating the at least one object with at least one user;
    maintaining a record of a number of times that actions are performed on the at least one object by the at least one user and a record of action types of the actions performed on the at least one object by the at least one user, wherein the types of the actions comprise an authoring action type, a response action type, a linking action type, and an editing action type, and wherein the record is maintained in meta data associated with the at least one object;
    associating a value with each of the action types of the actions performed on the at least one object by the at least one user;
    calculating a user affinity score for the user's association with the at least one object based on the number of times that actions are performed on the at least one object by the at least one user and the values associated with the action types of the actions performed on the at least one object by the at least one user;
    storing the user affinity score.

2. The method of claim 1, further comprising determining a user affinity to the category based on the affinity score for the user's association with the at least one object.

3. The method of claim 1 further comprising the step of: normalizing the affinity score calculated.

4. The method of claim 3, further comprising the step of: applying a population threshold of a plurality of users to the affinity score.

5. The method of claim 4, further comprising the step of: associating a predetermined percentage of the plurality of users with the user affinity for the at least one topic.

6. The method of claim 1, wherein the meta data associated with the at least one object comprises at least one of an author field that indicates authoring actions, a response to field that indicates response actions, a links field that indicates linking actions, an editors field that indicates editing actions, and a reading field that indicates reading actions.

7. The method of claim 1 wherein the affinity score for the user's association with the at least one object is calculated from a sum of weighted action type counts, wherein each action type count is determined by multiplying the number of times the user performed that action by the value associated with that action type.

8. The method of claim 7, wherein the affinity score is calculated according to a formula of:

$$A*Va+T*Vt+L*Vl+E*Ve+*Vr;$$

where A is the author field, Va is an author value associated with authoring actions, T is the response to field, Vt is a response to value associated with the response actions, L is the links field, Vi is a links value associated with linking actions, E is the editors field, Ve is an editors value associated with editing actions, R is the reading field, and Vr is a reading value associated with reading actions.

9. The method of claim 1, further comprising the step of: determining whether the at least one user has performed at least one action on the at least one object.

10. The method of claim 9, further comprising the step of: decaying the user affinity of the at least one user if a determination is made that the at least one user has not performed any actions on the at least one object.

11. The method of claim 10, wherein the step of decaying the user affinity decays at a constant rate.

12. The method of claim 11, wherein the constant rate is a predetermined percentage per a predetermined period of time.

13. The method of claim 9, further comprising the step of: resetting the user affinity if a determination is made that the at least one user has performed the at least one action on the at least one object.

14. The method of claim 1, further comprising the step of: enabling a system administrator to decline the user affinity.

15. The method of claim 1, further comprising the step of: enabling the user to decline the user affinity.

16. A system tangibly embodied on a computer for determining a user affinity for a topic comprising:
    assigning means for assigning a category to at least one object;
    associating means for associating the at least one object with at least one user;
    maintaining means for maintaining a record of a number of times that actions are performed on the at least one object by the at least one user and a record of action types of the actions performed on the at least one object by the at least one user, wherein the types of the actions comprise an authoring action type, a response action type, a linking action type, and an editing action type, and wherein the record is maintained in meta data associated with the at least one object;
    associating means for associating a value with each of the action types of the actions performed on the at least one object by the at least one user;
    calculating means for calculating a user affinity score for the user's association with the at least one object based on the number of times that actions are performed on the at least one object by the at least one user and the values associated with the action types of the actions performed on the at least one object by the at least one user and; and
    storage means for storing the user affinity score.

17. The system of claim 16, wherein the calculating means determines a user affinity to the category based on the determines affinity score for the user's association with the at least one object.

18. The system of claim 16, further comprising normalizing means for normalizing the affinity score calculated.

19. The system of claim 18, further comprising applying means for applying a population threshold of a plurality of users to the affinity score.

20. The system of claim 19, further comprising percentage associating means for associating a predetermined percentage of the plurality of users with the user affinity for the at least one topic.

21. The system of claim 16, wherein the meta data of the at least one object comprises at least one of an author field that indicates authoring actions, a response to field that indicates response actions, a links field that indicates linking actions, an editors field that indicates editing actions, and a reading field that indicates reading actions.

22. The system of claim 16, wherein the user affinity score for the user's association with the at least one object is calculated from a sum of weighted action type counts, wherein each action type count is determined by multiplying the number of times the user performed that action by the value associated with that action type.

23. The system of claim 22, wherein the affinity score is calculated according to a formula of:

$$A* Va+T*Vt+L*Vl+E*Ve+R*Vr;$$

where A is the author field, Va is an author value associated with authoring actions, T is the response to field, Vt is a response to value associated with response actions, L is the links field, Vl is a links value associated with linking actions, E is the editors field, Ve is an editors value associated with editing actions, R is the reading field, and Vr is a reading value associated with reading actions.

24. The system of claim 16, further comprising action determining means for determining whether the at least one user has performed at least one action on the at least one object.

25. The system of claim 24, further comprising decaying means for decaying the user affinity of the at least one user if a determination is made that the at least one user has not performed any actions on the at least one object.

26. The system of claim 25, wherein the decaying means decays the affinity score at a constant rate.

27. The system of claim 26, wherein the constant rate is a predetermined percentage per a predetermined period of time.

28. The system of claim 24, further comprising resetting means for resetting the user affinity if a determination is made that the at least one user has performed the at least one action on the at least one object.

29. The system of claim 16, further comprising declining means for enabling a system administrator to decline the user affinity.

30. The system of claim 16, further comprising declining means for enabling the user to decline the user affinity.

31. A system tangibly embodied on a computer-readable medium for determining a user affinity for a topic comprising:
   an assigning module that assigns a category to at least one object;
   an associating module that associates the at least one object with at least one user;
   a maintaining module that maintains a record of a number of times that actions are performed on the at least one object by the at least one user and a record of action types of the actions performed on the at least one object by the at least one user wherein the types of the actions comprise an authoring action type, a response action type, a linking action type, and an editing action type, and wherein the record is maintained in meta data associated with the at least one object;
   a determining module that associates a value with each of the action types of the actions performed on the at least one object by the at least one user, and calculates a user affinity score for the user's association with the at least one object based on the number of times that actions are performed on the at least one object by the at least one user and the values associated with the action types of the actions performed on the at least one object by the at least one user; and
   a storage module that stores the user affinity score.

32. The system of claim 31, wherein the determining module determines the user affinity for the user's association with the category based on the calculated user affinity score.

33. The system of claim 31, further comprising a normalizing module that normalizes the affinity score calculated.

34. The system of claim 32, further comprising an applying module that applies a population threshold of a plurality of users to the affinity score.

35. The system of claim 34, further comprising a percentage associating module that associates a predetermined percentage of the plurality of users with the user affinity for the at least one topic.

36. The system of claim 31, wherein the meta data of the at least one object comprises at least one of an author field that indicates authoring actions, a response to field that indicates response actions, a links field that indicates linking actions, an editors field that indicates editing actions, and a reading field that indicates reading actions.

37. The system of claim 36, wherein the user affinity score for the user's association with the at least one object is calculated from a sum of weighted action type counts, wherein each action type count is determined by multiplying the number of times the user performed that action by the value associated with that action type.

38. The system of claim 37, wherein the affinity score is calculated according to a formula of:

$$A*Va+T*Vt+L*Vl+E*Ve+R*Vr;$$

where A is the author value associated with authoring actions, T is the response to field, Vt is a response to value associated with response actions, L is the links field, Vl is a links value associated with linking actions, E is the editors field, Ve is an editors value associated with editing actions, R is the reading field, and Vr is a reading value associated with reading actions.

39. The system of claim 31, further comprising an action determining module that determines whether the at least one user has performed at least one action on the at least one object.

40. The system of claim 39, further comprising a decaying module that decays the user affinity of the at least one user if a determination is made that the at least one user has not performed any actions on the at least one object.

41. The system of claim 40, wherein the decaying module decays the affinity score at a constant rate.

42. The system of claim 41, wherein the constant rate is a predetermined percentage per a predetermined period of time.

43. The system of claim 39, further comprising a resetting module that resets the user affinity if a determination is made that the at least one user has performed the at least one action on the at least one object.

44. The system of claim 31, further comprising a declining module that enables a system administrator to decline the user affinity.

45. The system of claim 31, further comprising declining module that enables the user to decline the user affinity.

46. A processor readable medium comprising processor readable tangibly embodied thereon for determining a user affinity for a topic, the medium comprising:
   assigning code that causes a processor to assign a category to at least one object;

associating code that causes a processor to associate the at least one object with at least one user;

maintaining code that causes a processor to maintain a record of a number of times that actions are performed on the at least one object by the at least one user;

maintaining code that causes a processor to maintain a record of action types of the actions performed on the at least one object by the at least on user, wherein the types of the actions comprise an authoring action type, a response action type, a linking action type, and an editing action type, and wherein the record is maintained in meta data associated with the at least one object;

associating code that associates a value with each of the action types of the actions performed on the at least one object by the at least one user;

determining code that causes a processor to calculate a user affinity score for the user's association with the at least one object based on the number of times that actions are performed on the at least one object by the at least one user and the values associated with the action types of the actions performed on the at least one object by the at least one user, and storing code that stores the user affinity score.

47. The medium of claim 46, wherein the determining code determines a user affinity for the user's association with the category based on the calculated user affinity score.

48. The medium of claim 46, further comprising normalizing code that causes a processor to normalize the affinity score calculated.

49. The medium of claim 48, further comprising applying code that causes a processor to apply a population threshold of a plurality of users to the affinity score.

50. The medium of claim 49, further comprising percentage associating code that causes a processor to associate a predetermined percentage of the plurality of users with the user affinity for the at least one topic.

51. The medium of claim 46, wherein the meta data associated with the at least one object comprises at least one of an author field that indicates authoring actions, a response to field that indicates response actions, a links field that indicates linking actions, an editors field that indicates editing actions, and a reading field that indicates reading actions.

52. The medium of claim 46, wherein the user an affinity score for the user's association with the at least one object is calculated from a sum of weighted action type counts, wherein each action type count is determined by multiplying the number of times the user performed that action by the value associated with that action type.

53. The medium of claim 52, wherein the affinity score is calculated according to a formula of:

$$A*Va+T*Vt+L*Vl+E*Ve+R*Vr;$$

where A is the author value associated with authoring actions, T is the response to field, Vt is a response to value associated with response actions, L is the links field, Vl is a links value associated with linking actions, E is the editors field, Ve is an editors value associated with editing actions, R is the reading field, and Vr is a reading value associated with reading actions.

54. The medium of claim 46, further comprising action determining code that causes a processor to determine whether the at least one user has performed at least one action on the at least one object.

55. The medium of claim 54, further comprising decaying code that causes a processor to decay the user affinity of the at least one user if a determination is made that the at least one user has not performed any actions on the at least one object.

56. The medium of claim 55, wherein the decaying code decays the affinity score at a constant rate.

57. The medium of claim 56, wherein the constant rate is a predetermined percentage per a predetermined period of time.

58. The medium of claim 54, further comprising resetting code that causes a processor to reset the user affinity if a determination is made that the at least one user has performed the at least one action on the at least one object.

59. The medium of claim 46, further comprising declining code that causes a processor to enable a system administrator to decline the user affinity.

60. The medium of claim 46, further comprising declining code that causes a processor to enable the user to decline the user affinity.

* * * * *